(12) United States Patent
Brown, Jr. et al.

(10) Patent No.: US 12,103,730 B2
(45) Date of Patent: Oct. 1, 2024

(54) RECYCLABLE ABRASION RESISTANT DUNNAGE TRAY

(71) Applicant: Midland Compounding & Consulting, Inc., Midland, MI (US)

(72) Inventors: Thayer A. Brown, Jr., Midland, MI (US); Christopher M. Surbrook, Midland, MI (US)

(73) Assignee: Midland Compounding & Consulting, Inc., Midland, MI (US)

( * ) Notice: Subject to any disclaimer, the term of this patent is extended or adjusted under 35 U.S.C. 154(b) by 0 days.

(21) Appl. No.: 17/554,196

(22) Filed: Dec. 17, 2021

(65) Prior Publication Data

US 2022/0363426 A1 Nov. 17, 2022

Related U.S. Application Data

(63) Continuation of application No. 16/456,626, filed on Jun. 28, 2019, now abandoned.
(Continued)

(51) Int. Cl.
*B32B 3/28* (2006.01)
*B29C 48/00* (2019.01)
(Continued)

(52) U.S. Cl.
CPC ............ *B65D 1/36* (2013.01); *B29C 48/0017* (2019.02); *B29C 48/022* (2019.02); *B29C 48/21* (2019.02);
(Continued)

(58) Field of Classification Search
None
See application file for complete search history.

(56) References Cited

U.S. PATENT DOCUMENTS 3,717,245 A * 2/1973 Brander ................. B65D 85/42
217/53
3,776,145 A * 12/1973 Anderson ............... B66F 9/195
108/901
(Continued)

FOREIGN PATENT DOCUMENTS

BE 1013300 A3 11/2001
CN 202368872 U * 8/2012
(Continued)

OTHER PUBLICATIONS

Machine Translation of DE-29610010-U1, Aug. 1996 (Year: 1996).*
(Continued)

*Primary Examiner* — Jeffrey A Vonch
(74) *Attorney, Agent, or Firm* — Merchant & Gould P.C.

(57) ABSTRACT

A chaff resistant and economically recyclable dunnage tray is disclosed. In one aspect, the dunnage tray includes a base portion formed from a first material and a top portion formed from a second material. The top portion is secured to the base portion, and defines at least one cavity or recess for supporting a machine component. The first and second materials are high density polyethylene (HDPE) materials with the second material including polyethylene elastomers, or plastomers. In one example, the dunnage tray is formed by thermoforming a co-extruded sheet including a first layer corresponding to the bottom structural portion and a second layer corresponding to the elastomer or plastomer portion. In one example, the dunnage tray is formed by thermoforming an extruded sheet to form the base portion and by attaching separately formed top portions with polyethylene elastomers, or plastomers to the thermoformed base portion. This invention provides solutions to chaffing or chipping of polyethylene dunnage trays, control of coefficient of friction and softness to minimize parts from sliding/abrading dun-
(Continued)

nage surfaces, and eliminates requirements for disassembly of dunnage trays and separation of materials prior to recycling.

13 Claims, 9 Drawing Sheets

Related U.S. Application Data (60) Provisional application No. 62/692,228, filed on Jun. 29, 2018.

(51) Int. Cl.
| | | |
|---|---|---|
| B29C 48/21 | (2019.01) | |
| B29C 51/00 | (2006.01) | |
| B29C 51/02 | (2006.01) | |
| B29C 51/14 | (2006.01) | |
| B32B 7/022 | (2019.01) | |
| B32B 27/08 | (2006.01) | |
| B32B 27/32 | (2006.01) | |
| B65D 1/36 | (2006.01) | |
| B65D 81/133 | (2006.01) | |
| B65D 85/68 | (2006.01) | |
| B29C 45/16 | (2006.01) | |
| B29C 48/49 | (2019.01) | |
| B29K 105/26 | (2006.01) | |
| B29L 31/00 | (2006.01) | |

(52) U.S. Cl.
CPC ............ *B29C 51/002* (2013.01); *B29C 51/02* (2013.01); *B29C 51/14* (2013.01); *B32B 3/28* (2013.01); *B32B 7/022* (2019.01); *B32B 27/08* (2013.01); *B32B 27/32* (2013.01); *B32B 27/327* (2013.01); *B65D 81/133* (2013.01); *B65D 85/68* (2013.01); *B29C 45/16* (2013.01); *B29C 48/49* (2019.02); *B29K 2023/06* (2013.01); *B29K 2105/26* (2013.01); *B29L 2031/712* (2013.01); *B32B 2323/04* (2013.01); *B32B 2323/043* (2013.01); *B32B 2439/00* (2013.01); *B65D 2565/385* (2013.01); *B65D 2585/6877* (2013.01); *Y10T 428/24628* (2015.01); *Y10T 428/24661* (2015.01); *Y10T 428/31909* (2015.04); *Y10T 428/31913* (2015.04)

(56) References Cited

U.S. PATENT DOCUMENTS

| | | | | |
|---|---|---|---|---|
| 3,948,190 A | * | 4/1976 | Cook, III | B65D 19/004 108/55.3 |
| 4,428,306 A | * | 1/1984 | Dresen | B65D 19/004 108/901 |
| 4,649,007 A | * | 3/1987 | Bonis | B32B 27/08 428/339 |
| 4,693,507 A | * | 9/1987 | Dresen | B60R 13/01 296/39.2 |
| 4,946,340 A | | 8/1990 | Murphy et al. | |
| 5,080,023 A | * | 1/1992 | Miura | B65D 19/44 108/55.3 |
| 5,527,585 A | * | 6/1996 | Needham | B65D 19/0028 108/55.3 |
| 5,539,981 A | | 7/1996 | Burcham et al. | |
| 5,588,794 A | | 12/1996 | Panyard | |
| 5,894,804 A | * | 4/1999 | Werner | B65D 19/38 108/53.5 |
| 6,237,980 B1 | * | 5/2001 | Miles | B60R 13/01 296/39.2 |
| 6,372,323 B1 | * | 4/2002 | Kobe | B25G 1/10 4/581 |
| 6,719,508 B2 | | 4/2004 | Jones et al. | |
| 7,569,175 B1 | * | 8/2009 | Nilsen | B29C 49/0005 525/240 |
| 2001/0046588 A1 | * | 11/2001 | Sturtevant | B60R 13/01 428/141 |
| 2002/0114920 A1 | * | 8/2002 | Scholz | A63B 60/06 428/167 |
| 2002/0140247 A1 | * | 10/2002 | Emery | B60R 13/01 296/39.1 |
| 2003/0156916 A1 | * | 8/2003 | Jones | B65D 81/022 410/155 |
| 2004/0241360 A1 | | 12/2004 | Giblin et al. | |
| 2005/0019531 A1 | * | 1/2005 | Bazbaz | B65B 11/00 428/156 |
| 2005/0119426 A1 | * | 6/2005 | Roger | C08F 210/16 526/64 |
| 2007/0014978 A1 | | 1/2007 | Poloso | |
| 2007/0098937 A1 | | 5/2007 | DeKunder et al. | |
| 2007/0122640 A1 | * | 5/2007 | Poloso | B32B 1/00 428/483 |
| 2008/0022905 A1 | | 1/2008 | Trickett | |
| 2009/0202803 A1 | * | 8/2009 | Poloso | B32B 27/281 428/213 |
| 2012/0100357 A1 | * | 4/2012 | Michie, Jr. | B29C 48/267 264/211 |
| 2014/0051808 A1 | * | 2/2014 | Tse | C08F 236/20 525/74 |
| 2016/0108223 A1 | * | 4/2016 | Lam | B32B 27/327 525/240 |
| 2017/0008667 A1 | * | 1/2017 | Shuert | B65D 19/0036 |
| 2018/0134855 A1 | * | 5/2018 | Vielsack | C08J 3/24 |
| 2018/0222651 A1 | * | 8/2018 | Uchida | B32B 27/308 |
| 2019/0315019 A1 | * | 10/2019 | Barahona Osorio | B29B 17/04 |

FOREIGN PATENT DOCUMENTS

| | | | | |
|---|---|---|---|---|
| CN | 202368873 U | | 8/2012 | |
| CN | 205615883 U | * | 10/2016 | |
| CN | 206654297 U | * | 11/2017 | |
| DE | 2713674 A | * | 10/1977 | ............ B29C 33/18 |
| DE | 3608805 A1 | * | 9/1987 | ............ A47G 23/06 |
| DE | 19505094 A1 | * | 8/1996 | ............ A47B 96/00 |
| DE | 29610010 U1 | * | 8/1996 | ............ B65D 71/70 |
| EP | 407097 A2 | * | 1/1991 | ......... B65D 19/0004 |
| EP | 542553 A1 | * | 5/1993 | ............ B32B 27/08 |
| FR | 2910439 A1 | * | 6/2008 | ....... B29C 45/14778 |
| JP | 52133639 A | * | 11/1977 | ......... B65D 19/0012 |
| JP | 54144447 A | | 11/1979 | |
| JP | 56069147 A | * | 6/1981 | |
| JP | 57096945 A | * | 6/1982 | |
| JP | 58090918 A | * | 5/1983 | ........... C09D 123/16 |
| JP | 58102723 A | * | 6/1983 | ......... B65D 19/0012 |
| JP | 58102724 A | * | 6/1983 | ........... C09D 123/16 |
| JP | 60058339 A | * | 4/1985 | |
| JP | 60087047 A | * | 5/1985 | |
| JP | 02229846 A | * | 9/1990 | |
| JP | 07242236 A | * | 9/1995 | |
| JP | 07246655 A | | 9/1995 | |
| JP | 10258490 A | * | 9/1998 | |
| JP | 10338231 A | * | 12/1998 | |
| JP | 11034255 A | * | 2/1999 | |
| JP | 2000296845 A | | 10/2000 | |
| JP | 2001031052 A | * | 2/2001 | |
| JP | 2001071433 A | | 3/2001 | |
| JP | 2001315778 A | * | 11/2001 | |
| JP | 2007276354 A | * | 10/2007 | |
| JP | 2009149006 A | * | 7/2009 | |
| JP | 2010111397 A | * | 5/2010 | |
| JP | 2011000737 A | | 1/2011 | |
| JP | 2012076380 A | * | 4/2012 | ......... B29C 47/0019 |
| JP | 2012091797 A | * | 5/2012 | |
| KR | 2015094406 A | * | 8/2015 | |

(56) References Cited

FOREIGN PATENT DOCUMENTS

WO        WO-0029195 A1 *   5/2000   ............. B29C 47/06
WO        2015082085 A1     6/2015

OTHER PUBLICATIONS

Gale Group, Polyolefins get tough with metallocenes, Aug. 1996, Plastics Technology (Year: 1996).*
Machine Translation of JP-11034255-A, Feb. 1999 (Year: 1999).*
Dow Chemicals, Engage Polyolefin Elastomers: Product selection guide for transportation applications, 2019 (no month) (Year: 2019).*
Machine Translation of JP-07246655-A, Sep. 1995 (Year: 1995).
Machine Translation of JP-2011000737-A, Jan. 2011 (Year: 2011).
Machine Translation of CN-202368873-U, Aug. 2012 (Year: 2012).
Machine Translation of WO-2015082085-A1, Jun. 2015 (Year: 2015).
Tang, Novel polyolefin elastomer-based blends and their applications, 2000 (Year: 2000).

* cited by examiner

FIG. 18

RECYCLABLE ABRASION RESISTANT DUNNAGE TRAY

RELATED APPLICATION

This application is a continuation of U.S. patent application Ser. No. 16/456,626, filed Jun. 28, 2019; which claims priority to U.S. Provisional Patent Application Ser. No. 62/692,228, filed on Jun. 29, 2018, the entireties of which are incorporated by reference herein.

BACKGROUND

Dunnage trays are often used to store and ship parts in the automotive (and other) industries. These trays are often made from a single layer polyethylene (PE) sheet that is thermoformed to a shape that will provide protection for the intended part. Often the parts (e.g., engine components such as pistons, alternators, starters, etc.) that are placed on the dunnage trays have sharp edges and corners. If parts with sharp edges are placed directly against the PE tray, vibrations and movement of the parts on the tray will cause chafing/abrasion of the PE. Fragments of the PE will then undesirably deposit on the parts. These PE fragments will then have to be removed from the parts before the parts can be assembled or used, resulting in an extra cleaning operation. If the PE fragments are not removed, they could potentially cause failure of the assembly (e.g., an engine assembly).

One currently used solution to this chafing problem is to design the dunnage tray to include a bumper, such as a strap, button, or insert made from a non-chafing material such as a polyurethane elastomer. These bumpers or straps are installed on the dunnage trays by drilling or punching out holes or slots, cleaning the resulting debris, and then inserting and fastening the bumpers or straps in place. Of course, a separate operation is required to injection mold or otherwise form the bumpers or straps. These assembly operations are costly. It is also sometimes the case that the resulting debris from such an operation is not adequately cleaned from the tray, resulting in potential damage to the parts held by the tray. Additionally, to recycle the dunnage tray, additional steps and costs result from having to subsequently remove the bumpers and straps from the dunnage tray.

Improvements are desired.

SUMMARY

While investigating additives and formulations that might prevent chafing of polyethylene dunnage trays, it has been discovered that a surface provided with a high percentage of an elastomer or plastomer provides significant reduction in flaking caused by abrasion or chafing. It has been further discovered that certain polyethylene elastomers adequately performs a non-abrasion/anti-chafing function, yet are compatible enough with the polyethylene from which the dunnage tray is formed to be recycled back into the base or top polyethylene sheet without requiring disassembly of the dunnage tray. Such material combinations can be referred to as being compatibly recyclable, meaning that two or more materials are capable of forming a homogeneous mixture after size reduction (grinding) and re-extrusion into a sheet with or without the use of compatibilizers or coupling agents. Although the surface of such a dunnage tray will scratch and mar, said surface is highly resistant to flaking and breaking into smaller pieces that would contaminate objects ("dusting") placed on the dunnage trays. In addition, the plastomer or elastomer provides improved wear resistance and anti-slip performance over incumbent polyurethane.

In one example, a dunnage tray includes a rigid base portion formed from a first material including polyethylene and a flexible top portion formed from a second material that is adjacent the base portion, the flexible top portion defining at least one cavity or recess for supporting a machine component. In one aspect, the second material is relatively more elastic, and softer, than the first material and has a coefficient of friction that is higher than the first material, and the first and second materials are compatibly recyclable together to form the first material.

In another example, a recycled dunnage tray includes a rigid base portion formed from a regrind material including a first material and a second material, the second material being relatively more elastic and softer than the first material and having a coefficient of friction that is higher than the first material, and a flexible and soft top portion formed from the second material and being adjacent the base portion, the flexible top portion defining at least one cavity or recess for supporting a machine component.

In some examples, the second material includes one or more of a plastomer, an elastomer, a polyethylene elastomer, a copolymer of ethylene and co-monomers of octene, hexene butene, or propylene, and any of the aforementioned materials alone or blended with polyethylene.

In some examples, the second material is a polyethylene-based material.

In some examples, the second material is a polyethylene elastomer.

In some examples, the second material includes at least 25 percent by weight elastomers.

In some examples, the flexible top portion has a static coefficient of friction of at least twice that of the first material, and a durometer value below 95 Shore A, or 35 Shore D.

In some examples, the base portion and top portion are thermoformed from a co-extruded sheet.

In some examples, one or both of the base portion and top portion is injection molded.

In some examples, the top portion includes at least one insert mechanically fastened to the base portion.

In some examples, the base portion has any thickness and the top portion has a thickness of between 0.02 inch to about 0.1 inch.

In some examples, the flexible top portion is formed from the second material and the regrind material.

In one example, a method of forming a dunnage tray includes forming a base layer from a first material including polyethylene, forming a top layer from a second material, wherein the second material is relatively more elastic and softer than the first material and has a coefficient of friction that is higher than the first material, and forming a dunnage tray such that the base and top layer are adjacent to each other and such that at least the top layer defines at least one cavity or recess for supporting a machine component.

In some examples, recycling the dunnage tray into a regrind material is performed without separating the second layer from the first layer.

In some examples, the forming a first layer step includes forming a first layer from a regrind material that includes the first material and the second material.

In some examples, the forming a base layer step includes thermoforming the base layer.

In some examples, the forming a top layer step includes either thermoforming or injection molding the top layer.

In some examples, the method further includes the step of forming a groove or gap in the base layer, but not through the top layer, creating a flexible point in the dunnage tray that can be formed into a hinge.

In some examples, the forming a top layer and the forming a base layer steps include co-extruding the base and top layers together.

In one example, a slip sheet for supporting machine components includes a base layer formed from a first material including polyethylene, a top layer formed from a second material, the top layer being adjacent a first side of the base layer, and a bottom layer formed from the second material, the bottom layer being adjacent an opposite second side of the base layer, wherein the second material is relatively more elastic and softer than the first material and has a coefficient of friction that is higher than the first material, and wherein the first and second materials are compatibly recyclable together to form the first material. In some examples, a perimeter of the base layer is covered by the second material such that the base layer is fully encapsulated in the second material. In some examples, the second material of the slip sheet includes one or more of a plastomer, an elastomer, a polyethylene elastomer, a copolymer of ethylene and co-monomers of octene, hexene, butene or propylene any of the aforementioned materials alone or blended with polyethylene, and any of the aforementioned materials wherein the material is catalyzed by a metallocene. In some examples, the base layer is formed from the first material and a regrind material including the first material and the second material.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Various examples will be described in detail with reference to the drawings, wherein like reference numerals represent like parts and assemblies throughout the several views. Reference to various examples does not limit the scope of the claims attached hereto. Additionally, any examples set forth in this description are not intended to be limiting and merely set forth some of the many possible examples for the appended claims. Referring to the drawings, like reference numbers correspond to like or similar components throughout the several figures.

Figure 1:
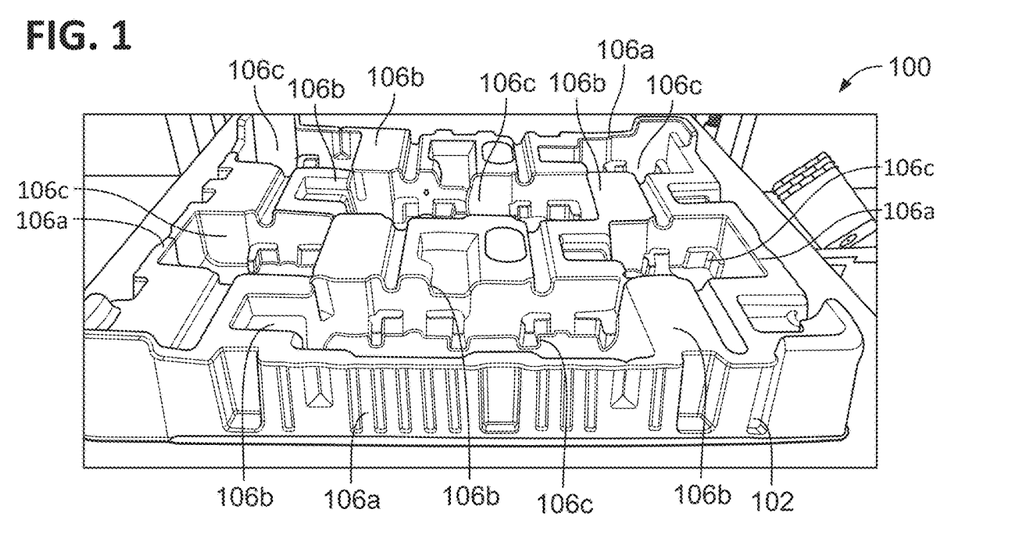
FIG. 1 is a top perspective view of a dunnage tray having features in accordance with the present disclosure.
Figure 2:
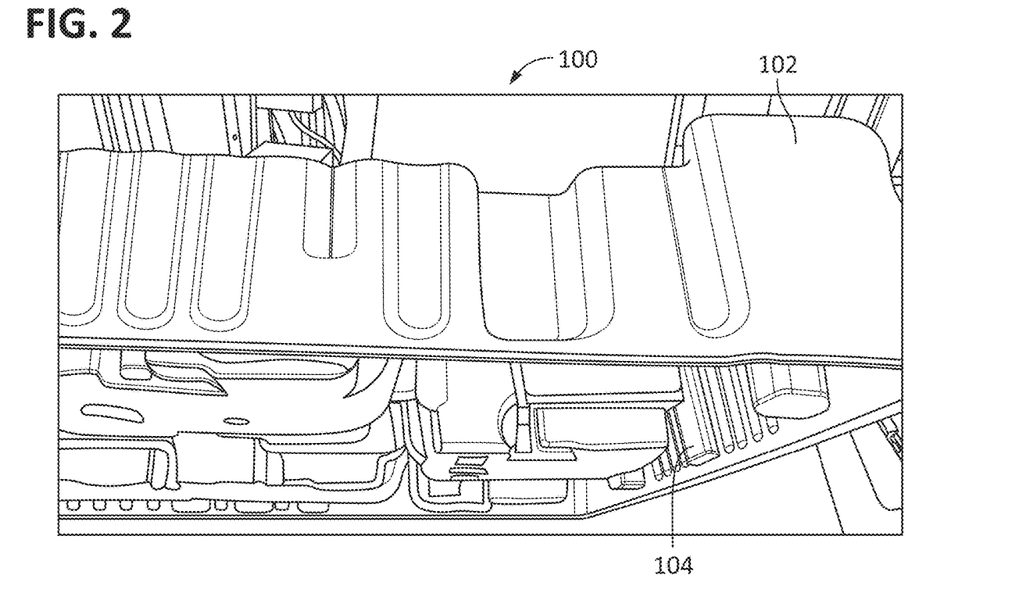
FIG. 2 is a partial bottom perspective view of the dunnage tray shown in FIG. 1.

Referring to FIGS. 1 and 2, a first example of a dunnage structure configured as a dunnage tray 100 having features in accordance with the present disclosure is presented. In one aspect, the dunnage tray 100 has a top or top side 102 and a base, bottom, or bottom side 104. The top side 102 defines a surface 106 that provides a non-chafing contact support surface for supporting machine components 10 (FIG. 3), such as automotive parts and assemblies, to be transported to another location. In the example shown, the surface 106 is formed from a polyethylene material including elastomers. Although discussed in more detail later in this section, the inclusion of elastomers in the polyethylene material defining the surface 106 greatly enhances the ability of the surface 106 to resist undesirable chafing.

To adequately retain the supported components, the surface 106 can be provided with surface features such as upstanding exterior and interior walls or structures 106a, 106b that define cavity areas 106c within which the components can be received. The surface 106 can be formed with any number of desired walls or structures 106a, 106b defining any number of desired cavities 106c to support a selected number of components. In the example shown, the surface 106 is contoured to form six cavities 106c.

Figure 3:
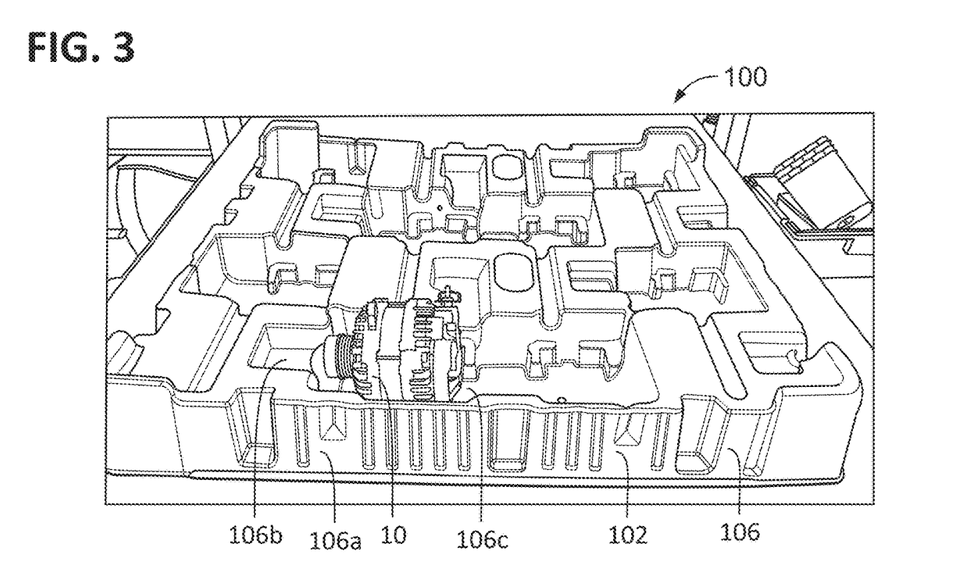
FIG. 3 is a top perspective view of the dunnage tray shown in FIG. 1, with a component being supported by the dunnage tray.

The surface 106 can be formed to retain multiples of the same component and/or different components. Referring to FIG. 3, a component 10 is shown being supported by the dunnage tray 100, wherein the dunnage tray 100 is provided with additional cavities 106c for supporting additional components 10. In the example shown, the component 10 is an alternator. The dunnage tray 100 and the shape of the surface 106 can be customized to support a variety of other types of components, such as gears, shafts, pumps, motors, piston assemblies, covers, and other mechanical and/or electrical components and assemblies.

In the example shown, the dunnage tray 100 is formed with four exterior walls or structures 106a to form a generally square or rectangular shape that can be supported by a standard wooden or plastic pallet (e.g., a pallet having approximate dimensions such as a width of 40 inches and a length of 48 inches). Alternatively, the dunnage tray 100 can be formed with features (e.g., openings to accept forks of a fork lift) that allow the dunnage tray 100 to be transported without the use of a pallet. The dunnage tray 100 can be provided with other shapes and sizes to meet any particular application.

In one aspect, the dunnage tray top and bottom 102, 104 are provided with matching profiles such that the dunnage tray 100 has a generally constant thickness throughout the dunnage tray 100. Such a configuration allows multiple dunnage trays 100 to be stacked together in a nested fashion when not in use, thus saving storage and transportation space.

Figure 4:
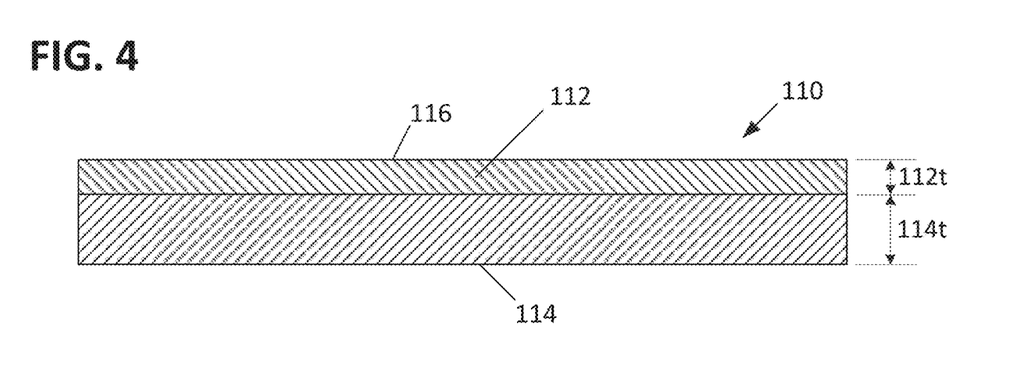
FIG. 4 is a schematic cross-sectional view of a co-extruded sheet suitable for use in forming the dunnage tray shown in FIG. 1.

Referring to FIG. 4, a schematic is presented showing that the dunnage tray 100 can be formed from a sheet 110 having multiple layers. In the example shown, the sheet 110 has a top layer 112 and a bottom layer 114 (i.e., A-B arrangement). In a preferable configuration, the bottom layer 114 provides the dunnage tray 100 with sufficient structural integrity to adequately support the components 10 held by the dunnage tray while the top layer 112 provides a contact surface 106 that is chafing resistant, wherein the entire dunnage tray 100 can be recycled without separating the top and bottom layers 112, 114. In some examples, the top layer 112 is formed from a relatively softer material than from which the bottom layer 114 is formed that minimizes sliding of the supported components across the surface. In some examples, the top layer 112 has a static coefficient of friction that is at least twice that of the bottom layer 114. In some examples, the top layer 112 has a durometer value below 95 Shore A, or 35 Shore D.

Figure 4A:
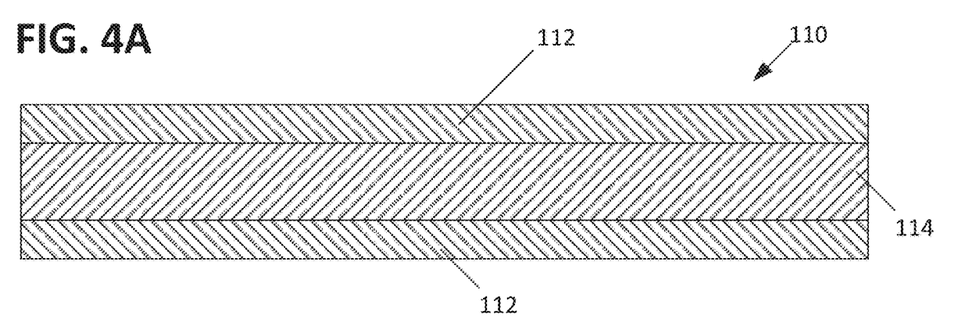
FIG. 4A is a schematic cross-sectional view of a co-extruded sheet structure suitable for use in forming the dunnage tray shown in FIG. 1 and the slip sheet shown in FIG. 16.
Figure 4B:
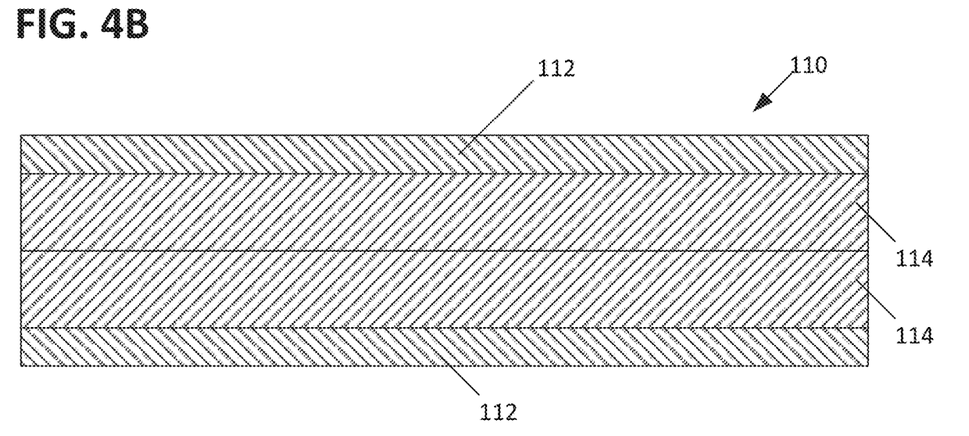
FIG. 4B is a schematic cross-sectional view of a co-extruded sheet structure suitable for use in forming the dunnage tray shown in FIG. 1 and the slip sheet shown in FIG. 16.
Figure 4C:
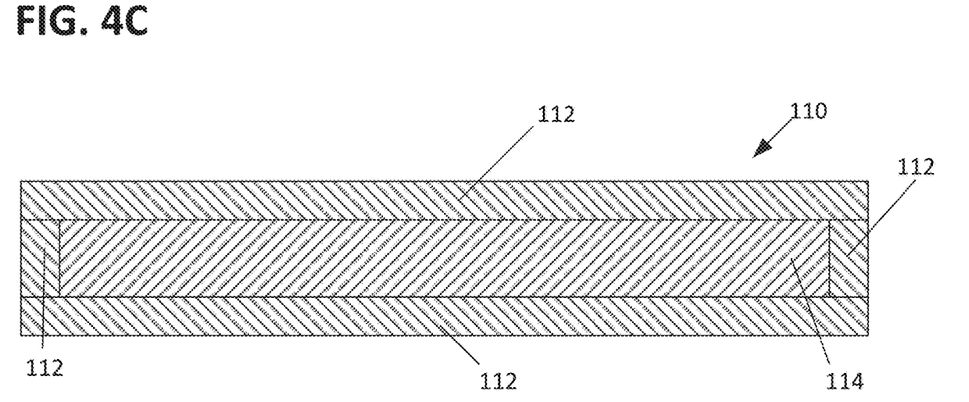
FIG. 4C is a schematic cross-sectional view of a co-extruded profile structure suitable for use in forming the dunnage tray shown in FIG. 1 and the slip sheet shown in FIG. 16.

In one aspect, the top layer 112 of the sheet 110 has a top surface 116 that defines the top surface 106 of the dunnage tray 100 once the sheet 110 is thermoformed into the dunnage tray 100. Although two layers are shown, more layers may be provided. For example, the sheet 110 can include a third layer similar to the top layer 112 that sandwiches the layer 114 (i.e., A-B-A arrangement) such that both the top and bottom surfaces of the dunnage tray 100 have resistance to chafing, as shown at FIG. 4A. Such a configuration allows for multiple loaded dunnage trays 100 to be stacked upon each other such that the bottom of one dunnage tray 100 rests on top of the components supported by the dunnage tray 100 below. FIG. 4B shows another embodiment in which two separate extrusions are initially formed with top and bottom layers 112, 114 and are then joined together such that the bottom layers 114 face each other (i.e., A-B-BA arrangement). FIG. 4C shows an example sheet 110 similar to that shown at FIG. 4A with the perimeter of the sheet 110 being covered by the layer 112 material such that the layer 114 is fully encapsulated within the material of layer 112. Once the extruded sheets are oriented in such a way, they can be thermoformed together to form the dunnage tray 100.

Figure 5:
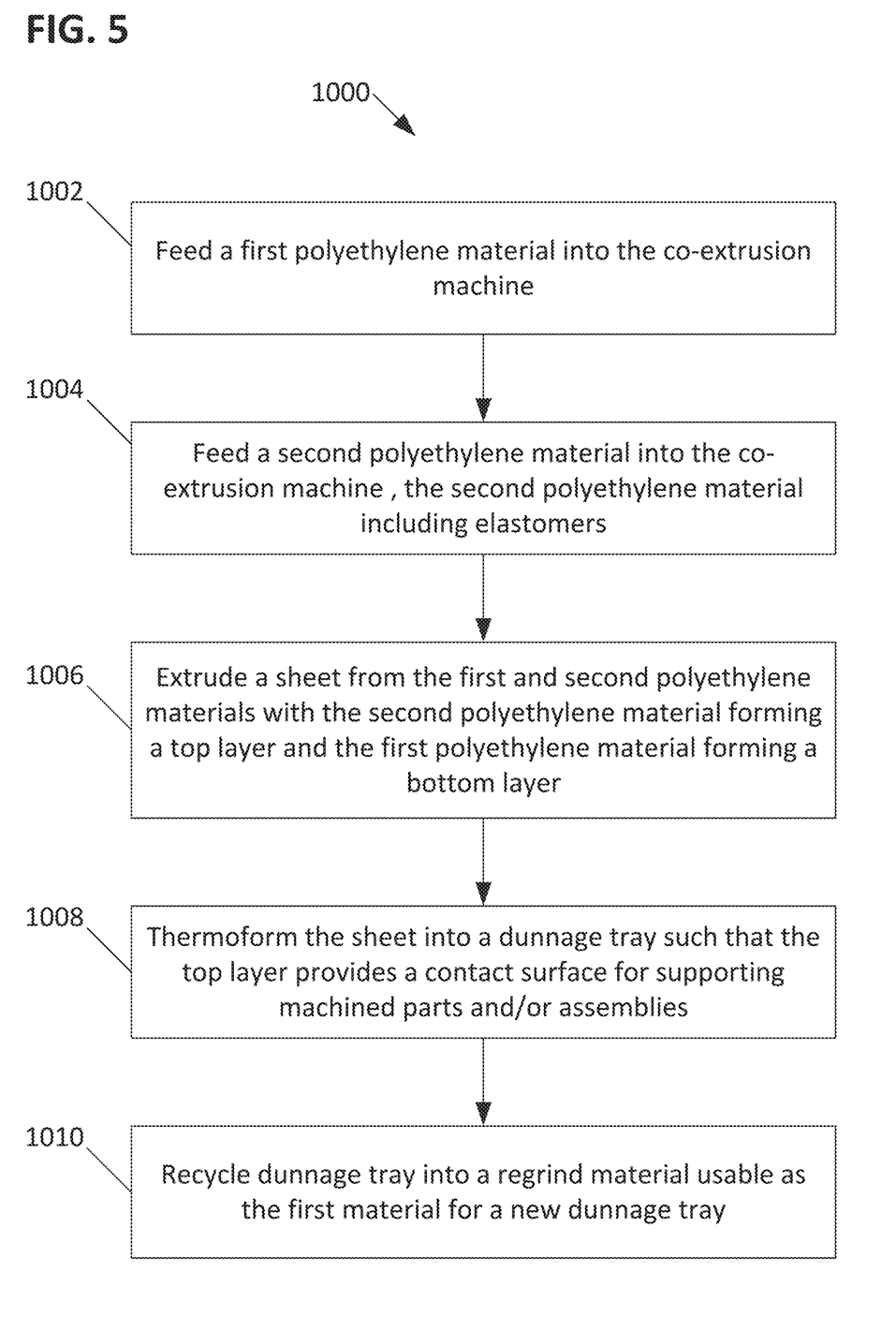
FIG. 5 is a process flow chart showing steps usable in forming the dunnage tray shown in FIG. 1.
Figure 9:
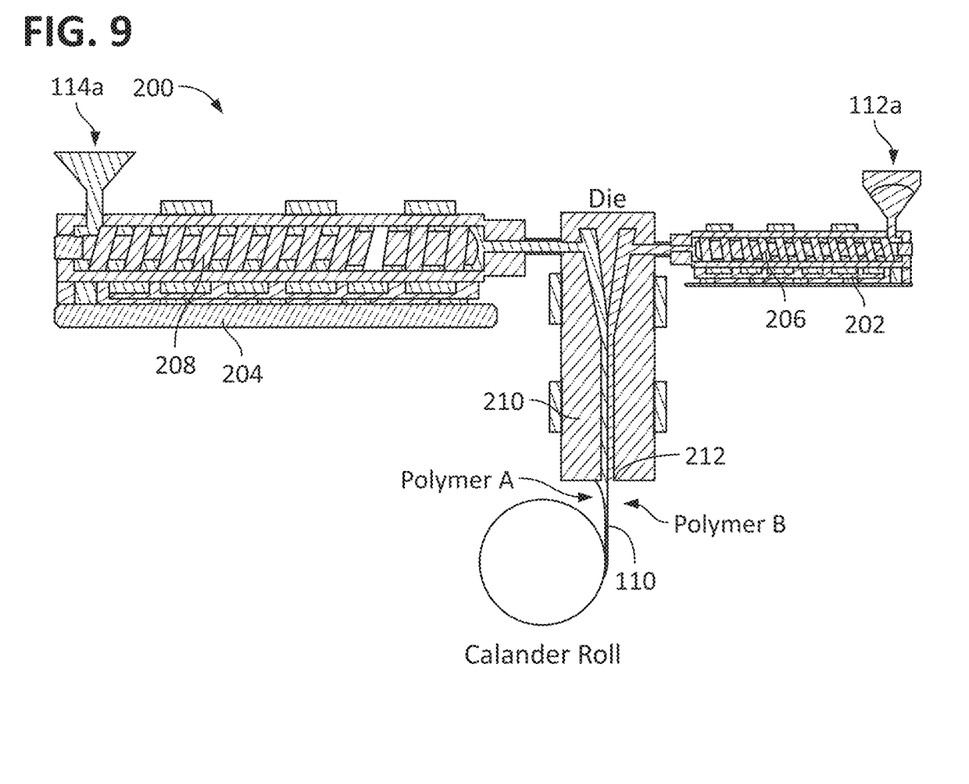
FIG. 9 is a schematic cross-sectional view of a co-extrusion machine suitable for use in forming the co-extruded sheet shown in FIG. 4.
Figure 10:
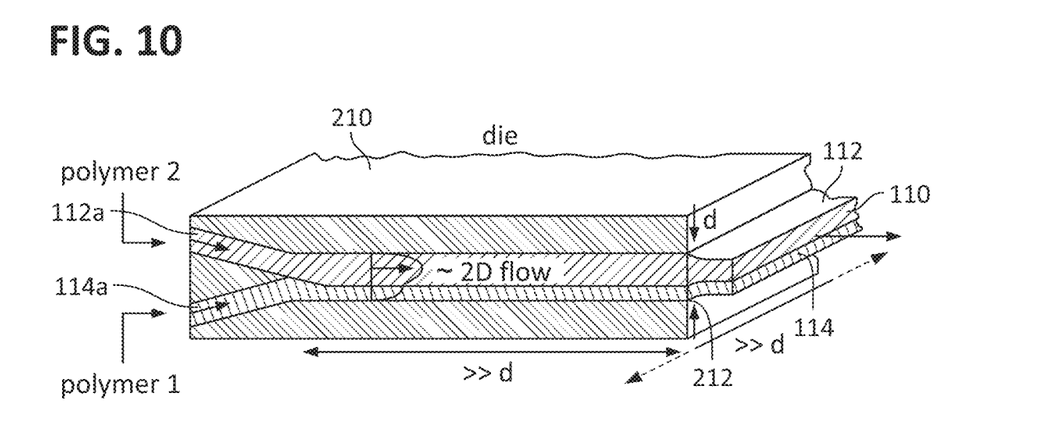
FIG. 10 is a schematic cross-sectional view of the die and extruded material shown in FIG. 9.
Figure 11:
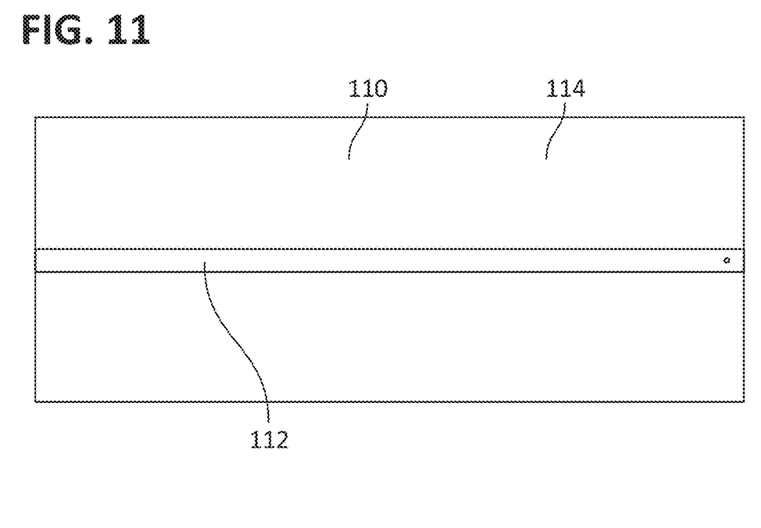
FIG. 11 is a schematic side view of a co-extruded sheet with a living hinge suitable for use in forming the dunnage tray shown in FIG. 1.
Figure 12:
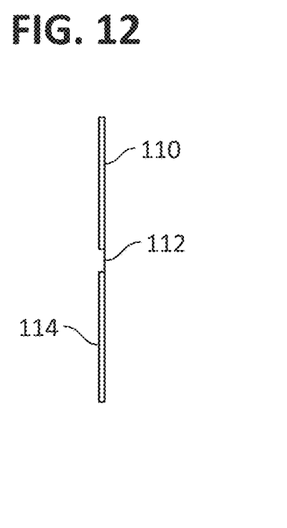
FIG. 12 is an end view of the co-extruded sheet shown in FIG. 11.
Figure 13:
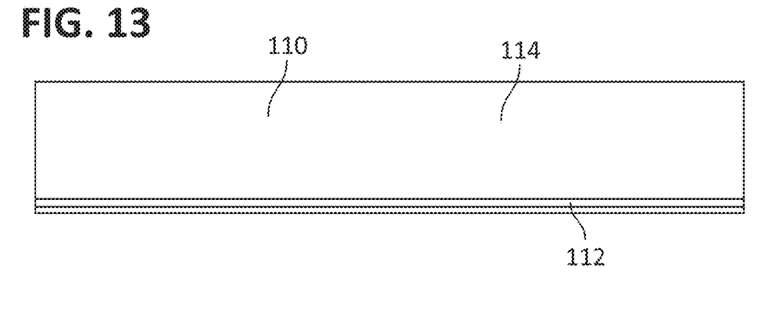
FIG. 13 is a side view of the co-extruded sheet shown in FIG. 11, with the co-extruded sheet being moved into a folded position.
Figure 14:
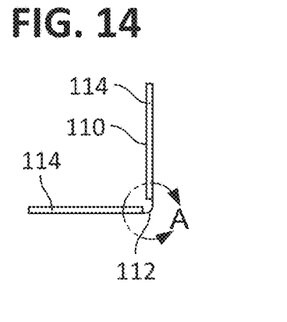
FIG. 14 is an end view of the folded co-extruded sheet shown in FIG. 13.
Figure 15:
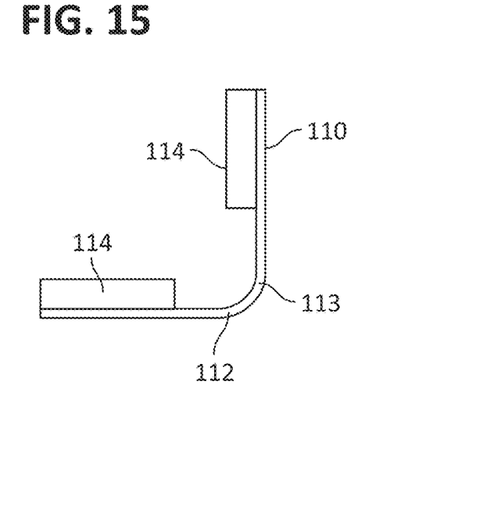
FIG. 15 is an enlarged partial view of a corner of the folded co-extruded sheet shown in FIG. 14.

In one example, the sheet 110 can be formed by a co-extrusion process 1000. FIG. 5 presents such a process, which can be performed by a co-extrusion machine 200 of the type shown at FIGS. 9 and 10. It is noted that the extruded sheet can be formed by a variety of co-extrusion machine types. In one step 1002, a first polyethylene material 114a can be fed into an inlet of a first extruder 202 of the co-extrusion machine 200. In a step 1004, a second polyethylene material 112a can be fed into an inlet of a second extruder 204 of the co-extrusion machine 200. The second polyethylene material 112a includes elastomers while the first polyethylene material 114a may or may not include elastomers. In a step 1006, a sheet 110 is extruded from the co-extrusion machine 200 via first and second extruder screws 206, 208 that respectively feed the first and second materials 114a, 112a into a die 210 and through an outlet 212 of the co-extrusion machine 200. At a step 1008, the sheet 110 is thermoformed into a dunnage tray such that the top layer 112 provides a contact surface for the components 10. In one example, a Brown Machine Group (Michigan, USA) rotary thermoformer is used for this step. Additional equipment can also utilized to implement process 1000, for example, a multiple roll down stack, pull rolls, etc. Once the dunnage tray 100 has completed its useful service life and/or is no longer suitable for use, the dunnage tray 100 can be recycled by grinding the entire dunnage tray 100 into a regrind material which can be used to form the first material 114a for the bottom layer 114 of a new sheet 110 from which a dunnage tray 100 can be formed, as described above. In some examples, the regrind material from a recycled dunnage tray 100 can also be used as a constituent component for the top layer 112. This recycling feature of the dunnage trays 100 is also advantageous because excess or scrap material generated during the formation of the tray, which can be 30% or more of the material in the finally produced tray, can also be recycled by grinding into a regrind material usable for the formation of subsequent trays.

In one example implementation of process 1000, co-extrusion line temperatures were set from 400 degrees Fahrenheit (F) to 460 degrees F. while an associated roll stack was set at 205 degrees F. The extrusion machine 200 was set up to produce 8-inch wide sheets for testing. After setting up the machine, various material compositions were used for the top layer 112 and chafing was assessed. Chafing was judged by scraping a new razor blade knife on the surface of the sheet and carefully observing any pieces of the sheet that were dislodged. The table shown below shows the experiments and variables used to produce a number of samples.

| Sample | A | B | C | D | E |
|---|---|---|---|---|---|
| Bottom Layer 114 | | | | | |
| Composition | HDPE Regrind | HDPE Regrind | HDPE Regrind | HDPE Regrind | HDPE Regrind |
| Extruder RPM | 60 | 110 | 90 | 90 | 110 |
| Thickness, in | — | ~.068 | ~.052 | ~.052 | ~.060 |

-continued

| Sample | A | B | C | D | E |
|---|---|---|---|---|---|
| Top Layer 112 | | | | | |
| Composition | Regrind | 75% Virgin HDPE 25% Elastomer | 50% HDPE Regrind 50% Elastomer | 25% HDPE Regrind 75% Elastomer | 50% Virgin HDPE 50% Elastomer |
| Extruder RPM | 100 | 30 | 80 | 80 | 80 |
| Thickness, in | — | ~.030 | ~.048 | ~.051 | ~.051 |
| Total thickness, in | ~.125 | ~.098 | ~.100 | ~.103 | ~.111 |
| Flaking/Chafing | yes | light | none | none | none |

In all samples produced, a high molecular weight, high density polyethylene copolymer (HDPE) regrind was utilized for the bottom layer 114. In one example, a PAXON BA50-100 polyethylene resin made by PAXON Polymer Co., a joint venture of Allied Signal and Exxon Chemicals was used. Regrind is material that has undergone at least one processing method, such as extrusion, that is then ground, chopped, or otherwise mechanically reduced into small particles suitable for forming a new product. Typically, in dunnage tray manufacturing, this polyethylene copolymer regrind is mixed 50/50 with virgin high density polyethylene resin, extruded into 0.250 inch sheet, and thermoformed into dunnage trays. In sample A, the polyethylene copolymer regrind material was used for the top layer 112 to provide a reference for comparison. In samples B, C, D, and E, a polyolefin elastomer (i.e., ethylene-octene copolymer) was mixed with either polyethylene copolymer regrind (samples C, D) or a virgin polyethylene copolymer resin (samples A, E) at various ratios and then extruded to form the top layer 112.

Sample A was found to flake or chafe when exposed to a sharp edge, as anticipated. Sample B, which included 75% by weight virgin polyethylene copolymer mixed with 25% by weight polyolefin elastomer and extruded to a thickness of 0.03 inch was found to have slight chafing or flaking when exposed to a sharp edge. Sample C, which included 50% regrind polyethylene copolymer mixed with 50% polyolefin elastomer and extruded to a thickness of about 0.48 inch was found to have no chafing or flaking when exposed to a sharp edge. Sample D, which included 25% regrind polyethylene copolymer mixed with 75% polyolefin elastomer and extruded to a thickness of about 0.51 inch was also found to have no chafing or flaking when exposed to a sharp edge. Sample E, which included 50% virgin polyethylene copolymer mixed with 50% polyolefin elastomer and extruded to a thickness of 0.60 inch was also found to have no chafing or flaking when exposed to a sharp edge.

Based on the above test results, in combination with further tests and analyses, it has been determined that utilization of more than 25% polyolefin elastomer in the top layer 112 significantly changes the way polyethylene sheets chafe when abraded with a razor knife. Although all of the tested materials scratched and marred significantly, those that had 50% or more elastomer (e.g., Samples C, D, and E) did not have material flaking off the surface regardless of whether virgin or regrind polyethylene copolymer was used. In some examples, the thickness of the top layer 112 is between 0.02 inch and 0.1 inch. In one example, the thickness of the top portion 112 is about 0.04 inch. In some examples, the base portion 114 and top portion 112 have a combined thickness of about 0.1 inch.

Figure 6:
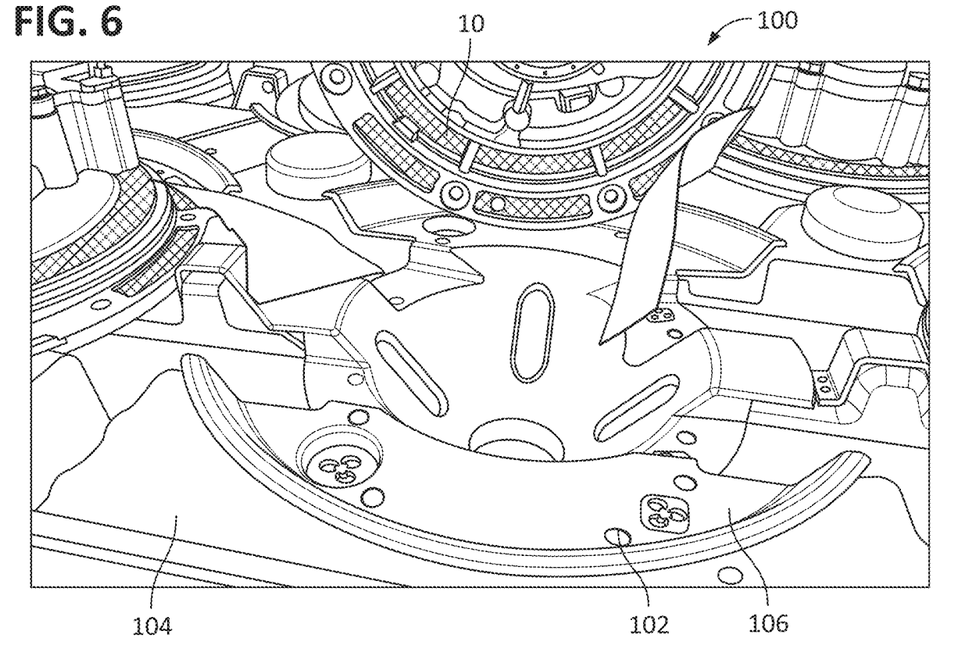
FIG. 6 is a partial top perspective view of a second example of a dunnage tray having features in accordance with the present disclosure.
Figure 7:
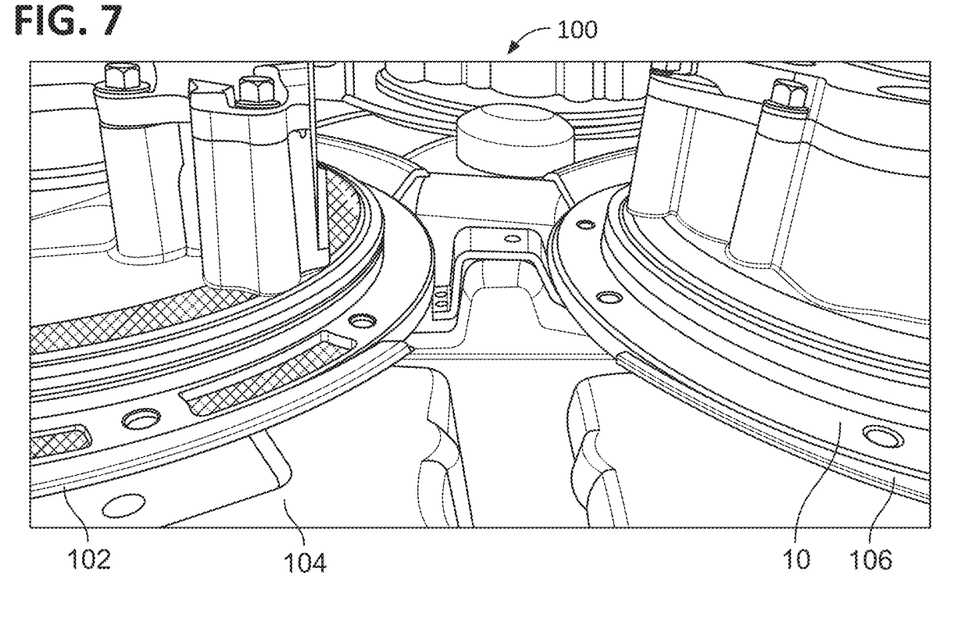
FIG. 7 is a partial top perspective view of the dunnage tray shown in FIG. 6, with a component being supported by the dunnage tray.

Referring to FIGS. 6 and 7, a second example is shown in which the dunnage tray 100 is not co-extruded, but is rather formed from separate components that are assembled together. In one aspect, the dunnage tray 100 shown in FIGS. 6 and 7 is formed with a bottom 104 that provides the dunnage tray 100 with sufficient structural integrity to adequately support the components 10. As shown, the base 104 is a single layer polyethylene material, and can be formed from the previously described virgin or regrind materials via thermoforming an extruded sheet to the desired shape.

In another aspect, the dunnage tray is provided with one or more inserts 102 that attach to the base 104 component of the dunnage tray 100 and define the top surface 106 that supports and makes direct contact with the components 10. The inserts 102 can be formed from the same elastomer-containing materials as previously described for the dunnage tray shown at FIGS. 1-3. However, since the inserts 102 are formed separately from the base 104, the inserts 102 can either be thermoformed from an extruded sheet or injection molded from pellet material. As should be appreciated, the material descriptions and observations provided for the dunnage tray 100 shown in FIGS. 1-3 are fully applicable for the dunnage tray base 104 and inserts 102 shown in FIGS. 6 and 7.

In one aspect, the inserts 102 and base 104 can be formed with cooperating features to allow for attachment of the inserts 102 to the base 104. For example, the base 104 can be provided with protrusions that extend through corresponding apertures in the inserts to create a snap-fit type connection, or vice versa. Other mechanical approaches and adhesives can also be used.

As with the dunnage tray 100 shown in FIGS. 1-3, the entire assembled dunnage tray 100 shown in FIGS. 6-7 can be advantageously recycled without first separating the inserts 102 from the base 104. As noted above, such a configuration is advantageous over prior art dunnage tray assemblies using different materials that cannot be suitably recycled together into a material suitable for forming a new dunnage tray. For such trays, a labor intensive separation step is required to disassemble the dunnage tray prior to recycling the individual component materials.

Figure 8:
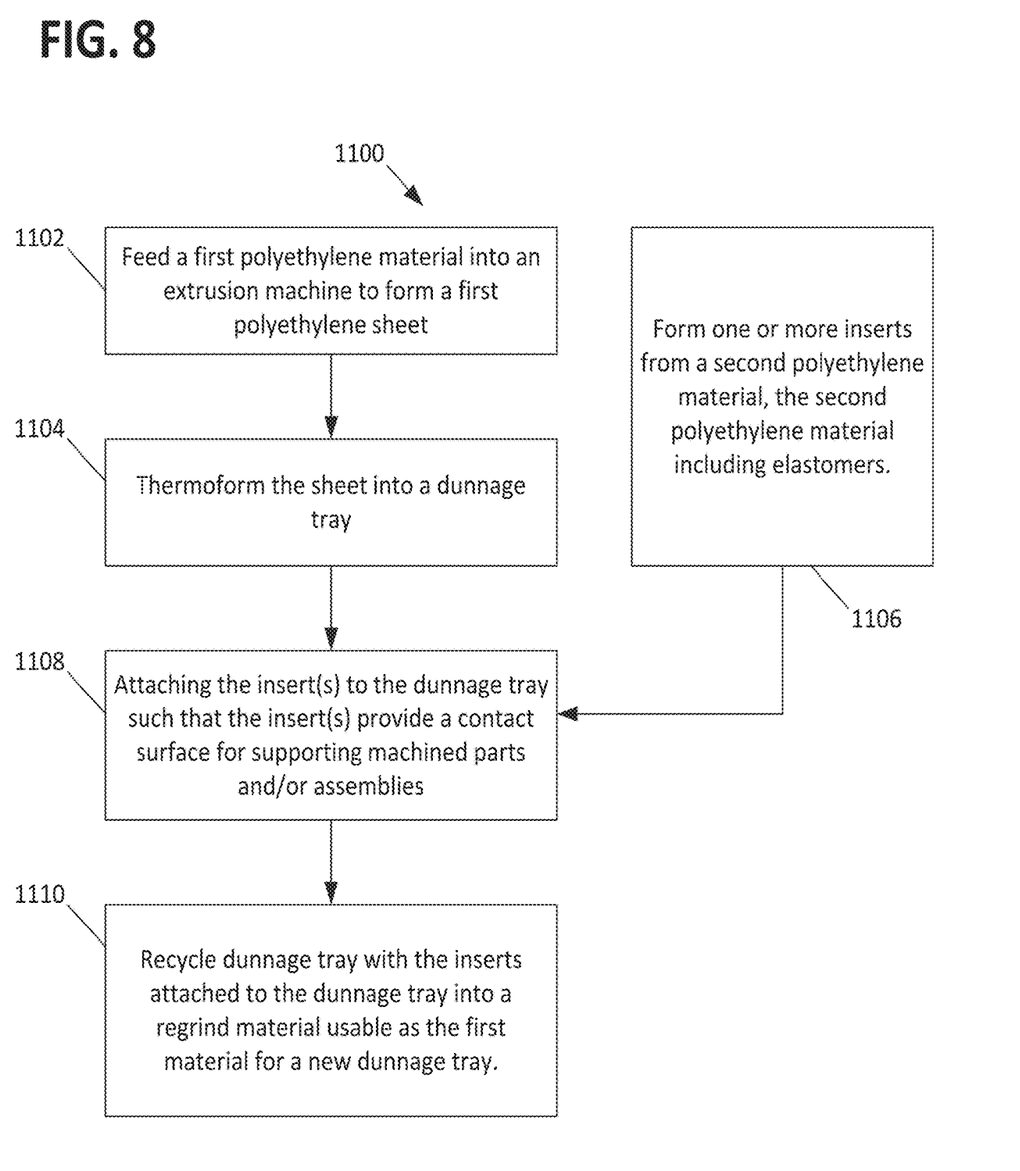
FIG. 8 is a process flow chart showing steps usable in forming the dunnage tray shown in FIG. 6.

In one example, the dunnage tray 100 shown in FIGS. 6 and 7 can be formed by a process 1100. FIG. 8 presents such a process. In one step 1102, a first polyethylene material can be fed into a first inlet 202 of an extrusion machine to form a sheet. The first polyethylene material may or may not include elastomers. At a step 1104, the sheet is thermoformed into a dunnage tray base portion. In a step 1106, one or more inserts are formed from a second polyethylene material that includes elastomers via an extrusion and thermoforming process, or by an injection molding process. In a step 1108, the one or more inserts are attached to the dunnage tray such that the inserts provide a contact surface for supporting machined parts and/or assemblies. Once the dunnage tray 100 has completed its useful service life and/or is no longer suitable for use, the dunnage tray 100 can be recycled in a step 1110. Such a step may be accomplished by grinding the entire dunnage tray 100, with the inserts 102 attached to the base 104, into a regrind material. The regrind material can be used to form the first material for the base 104 of a new sheet from which a dunnage tray 100 can be formed, as described above.

With reference to FIGS. 11-15, a variation of a sheet 110 usable to form the dunnage tray 100 is presented. As shown, sheet 110 in FIGS. 11-15 is provided with a living hinge 113 that allows the sheet to bend at the location of the hinge. Accordingly, the living hinge can be used instead of or in addition to thermoforming the sheet to form features to retain and secure the machine components 10, and for other purposes. As shown, the living hinge 113 is created from a co-extruded sheet 110 by removing a selected portion of the layer 114 such that only layer 112 remains at a selected location. As the layer 112 is relatively flexible, the remaining portions of the sheet 110 that include both layers 112, 114 can rotate relative to each other about the living hinge 113.

Figure 16:
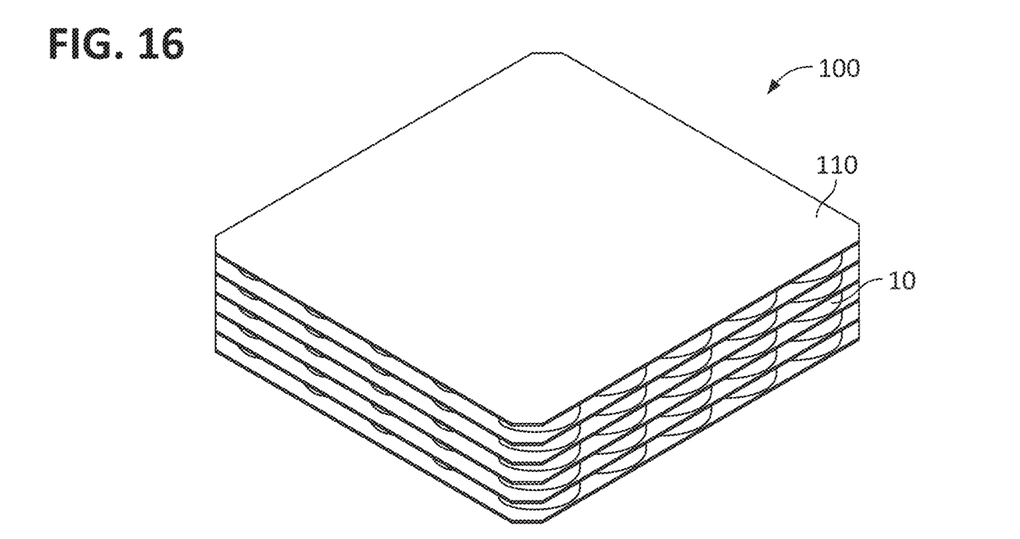
FIG. 16 is a top perspective view of a stacked arrangement including co-extruded sheets supporting machine components.
Figure 17:
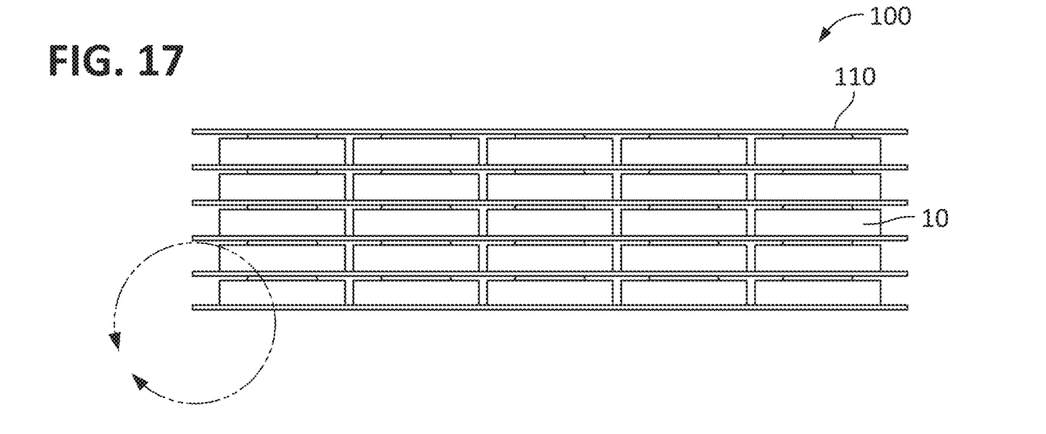
FIG. 17 is a side view of the stacked arrangement shown in FIG. 16.
Figure 18:
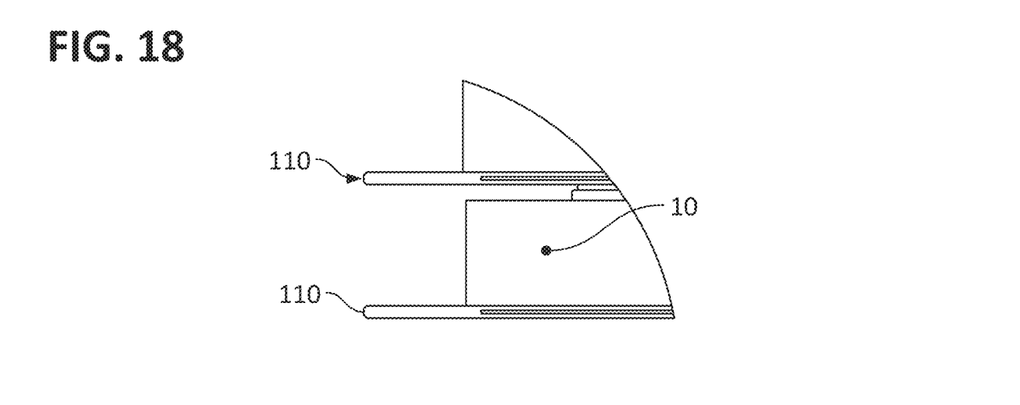
FIG. 18 is an enlarged partial view of the stacked arrangement shown in FIG. 17.

Referring to FIGS. 16-18, an alternative configuration is presented in which the co-extruded sheets 110 are dunnage structures that are used as slip sheets 110 to support machine components 10 in a stacked arrangement. The slip sheets 110 can have any of the configurations shown at FIGS. 4, 4A, 4B, and 4C. A benefit of using the sheets 110 of FIGS. 4A, 4B, and 4C is that both sides of the sheet have a layer 112 such that the machine components 10 are exposed only to the layer 112 of the below and above sheets 110. The slip sheet 110, which can be also referred to as a dunnage tray, can be completely smooth or can be thermoformed or otherwise modified to include surface features to enhance retention of the machine components 10.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed is:

1. A dunnage tray, comprising:
 a) a rigid base portion formed from a first material; and
 b) a flexible top portion formed from a second material and being adjacent to the base portion, wherein the flexible top portion and the rigid base portion are thermoformed together from a co-extruded sheet to define a plurality of upstanding exterior wall structures and a plurality of upstanding interior wall structures, the plurality of interior wall structures forming a plurality of cavities or recesses for supporting and receiving machine components on the flexible top portion, wherein the co-extruded sheet has an overall thickness of at least about 0.1 inch and comprises a base layer, including the first material and having a thickness of at least 0.05 inch, and a top layer, including the second material and having a thickness of greater than 0.03 inch,
  wherein the first material includes a high molecular weight, high density polyethylene copolymer (HDPE),
  wherein the second material includes a blend of, at least 50 percent by weight, a metallocene catalyzed, polyolefin elastomer and, at least 25 percent by weight, HDPE, and
  wherein the second material is relatively more elastic and softer than the first material and has a static coefficient of friction that is higher than the first material, and wherein the first and second materials are compatibly recyclable together such that the dunnage tray is grindable, without separation and/or disassembly, to form the first material.

2. The dunnage tray of claim 1, wherein the polyolefin elastomer includes an ethylene-octene copolymer.

3. The dunnage tray of claim 1, where the flexible top portion has a static coefficient of friction of at least twice that of the first material, and a durometer value below 95 Shore A or 35 Shore D.

4. The dunnage tray of claim 1, wherein the dunnage tray is a recycled dunnage tray in which the rigid base portion includes a regrind material comprising the first material and the second material from a ground dunnage tray that have been processed and formed into the rigid base portion.

5. The dunnage tray of claim 4, wherein the flexible top portion includes the regrind material as the HDPE or includes virgin HDPE.

6. The dunnage tray of claim 1, wherein a groove or gap is formed into the base layer, but not through the top layer, creating a hinge point in the dunnage tray.

7. The dunnage tray of claim 1, wherein the top portion further includes at least one insert mechanically fastened to the base portion.

8. The dunnage tray of claim 1, wherein the top portion has a thickness of between 0.03 inch to about 0.1 inch.

9. A method of forming a dunnage tray, comprising:
 a) co-extruding a sheet having an overall thickness of at least about 0.1 inch and comprising a base layer, including a first material and having a thickness of at least 0.05 inch, and a top layer, including a second material and having a thickness of greater than 0.03 inch;
 b) thermoforming the co-extruded sheet to form a rigid base portion formed from the first material and a flexible top portion formed from the second material and being adjacent to the base portion and to define a plurality of upstanding exterior wall structures and a plurality of upstanding interior wall structures, the plurality of interior wall structures forming a plurality of cavities or recesses for supporting and receiving machine components on the flexible top portion,
  wherein the first material includes a high molecular weight, high density polyethylene copolymer (HDPE),
  wherein the second material includes a blend of, at least 50 percent by weight, a metallocene catalyzed, polyolefin elastomer and, at least 25 percent by weight, HDPE, and
  wherein the second material is relatively more elastic and softer than the first material and has a static coefficient of friction that is higher than the first material, and wherein the first and second materials are compatibly recyclable together such that the dunnage tray is grindable, without separation and/or disassembly, to form the first material.

10. The method of forming the dunnage tray of claim 9, further comprising recycling the dunnage tray into a regrind material without separating or disassembling the flexible top portion from the rigid base portion.

11. The method of forming the dunnage tray of claim 10, wherein the dunnage tray is formed as a recycled dunnage tray, wherein the base layer is formed from the regrind material.

12. The method of forming the dunnage tray of claim 11, wherein the blend of the top layer includes the regrind material.

13. The method of forming the dunnage tray of claim 9, further comprising forming a groove or gap in the base layer, but not through the top layer, creating a flexible point in the dunnage tray that can be formed into a hinge.

* * * * *